(12) United States Patent
Lemoff et al.

(10) Patent No.: US 10,712,564 B2
(45) Date of Patent: Jul. 14, 2020

(54) ADVANCED OPTICAL DESIGNS FOR EYE-MOUNTED IMAGING SYSTEMS

(71) Applicant: Spy Eye, LLC, Palo Alto, CA (US)

(72) Inventors: Brian Elliot Lemoff, Morgan Hill, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 74 days.

(21) Appl. No.: 16/034,761

(22) Filed: Jul. 13, 2018

(65) Prior Publication Data

US 2020/0018955 A1 Jan. 16, 2020

(51) Int. Cl.
*G02B 27/01* (2006.01)
*G02C 7/04* (2006.01)

(52) U.S. Cl.
CPC ............ *G02B 27/017* (2013.01); *G02C 7/04* (2013.01); *G02B 2027/0138* (2013.01)

(58) Field of Classification Search
CPC .... G02C 7/04; G02B 17/0605; G02B 27/017; G02B 2017/0138; G02B 27/01
USPC ...................................... 351/159.02; 345/7–9
See application file for complete search history.

(56) References Cited

U.S. PATENT DOCUMENTS

| | | |
|---|---|---|
| 4,711,512 A | 12/1987 | Upatnieks |
| 5,638,218 A | 6/1997 | Oomura |
| 5,638,219 A | 6/1997 | Medina Puerta et al. |
| 6,560,039 B1 | 5/2003 | Webb et al. |
| 8,134,778 B2 | 3/2012 | Guyer |
| 8,571,789 B2 | 10/2013 | Monde et al. |
| 8,786,675 B2 | 7/2014 | Deering |
| 8,956,281 B2 | 2/2015 | Wilson |
| 9,063,352 B2 | 6/2015 | Ford et al. |
| 9,111,473 B1 | 8/2015 | Ho et al. |
| 9,134,534 B2 | 9/2015 | Border et al. |
| 9,251,745 B2 | 2/2016 | Sprague |
| 2002/0140906 A1 | 10/2002 | Gibbon et al. |
| 2005/0180687 A1 | 8/2005 | Amitai |
| 2009/0185135 A1 | 7/2009 | Volk |
| 2009/0189830 A1 | 7/2009 | Deering et al. |
| 2010/0033561 A1 | 2/2010 | Hersee |
| 2011/0176205 A1 | 7/2011 | Shaw et al. |
| 2011/0221658 A1 | 9/2011 | Haddick |

(Continued)

FOREIGN PATENT DOCUMENTS

GB 1216075 A 12/1970

OTHER PUBLICATIONS

International Search Report and Written Opinion for Application No. PCT/US19/39013, dated Aug. 29, 2019, 15 pages.

(Continued)

*Primary Examiner* — Darryl J Collins
(74) *Attorney, Agent, or Firm* — Fenwick & West LLP

(57) ABSTRACT

An eye-mounted device includes a contact lens and an embedded imaging system. The front aperture of the imaging system faces away from the user's eye so that the image sensor in the imaging system detects imagery of a user's external environment. The optics for the imaging system has a folded optical path, which is advantageous for fitting the imaging system into the limited space within the contact lens. In one design, the optics for the imaging system is based on a two mirror design, with a concave mirror followed by a convex mirror.

20 Claims, 11 Drawing Sheets

(56) References Cited

U.S. PATENT DOCUMENTS

| | | |
|---|---|---|
| 2011/0221659 A1 | 9/2011 | King, III et al. |
| 2013/0278631 A1 | 10/2013 | Border |
| 2014/0098226 A1 | 4/2014 | Pletcher et al. |
| 2014/0118829 A1 | 5/2014 | Ma |
| 2014/0204003 A1 | 7/2014 | Deering |
| 2015/0301338 A1 | 10/2015 | Van Heugten |
| 2015/0312560 A1 | 10/2015 | Deering et al. |
| 2016/0026253 A1 | 1/2016 | Bradski |
| 2016/0097940 A1 | 4/2016 | Sako et al. |
| 2016/0150951 A1 | 6/2016 | Du |
| 2017/0023793 A1* | 1/2017 | Shtukater ........... G02B 27/0179 |

OTHER PUBLICATIONS

PCT International Search Report and Written Opinion, PCT Application No. PCT/US19/39013, dated Aug. 29, 2019, 15 pages.

Avago Technologies, "ADNE-2620 Optical Mouse Sensor Data Sheet," Mar. 27, 2008, 27 pages.

"8.2 All-Reflecting Two-Mirror Telescopes," Datasheet telescope-optics, telescope-optics.net, Aug. 3, 2016, 4 pages, [Online] [Retrieved on Dec. 14, 2017] Retrieved from the Internet<URL:https://web.archive.org/web/20160803183105/http://www.telescope-optics.net/two-mirror.htm>.

PCT International Search Report and Written Opinion, PCT Application No. PCT/US17/57240, dated Jan. 12, 2018, 23 pages.

Peifu, G., "Design and Preparation of Quarter-Wave Plate Coatings," National Air Intelligence Center, May 12, 1995, 16 pages.

Tremblay, E.J. et al., "Ultrathin Cameras Using Annular Folded Optics," Applied Optics, pp. 463-471, vol. 46, No. 4.

All-Reflecting Two-Mirror Telescopes, (Aug. 3, 2016), URL: https://web.archive.org/web/20160803183105/ http://www.telescope-optics.net/two-mirror.htm, (Dec. 14, 2017) (5 pages).

Song et al "Baffles design for the axial two-mirror telescope", Optical Engineering, 2002, vol. 41, No. 9, pp. 2353-2357.

* cited by examiner

ADVANCED OPTICAL DESIGNS FOR EYE-MOUNTED IMAGING SYSTEMS

BACKGROUND

1. Technical Field

This disclosure relates generally to an eye-mounted imaging system.

2. Description of Related Art

Handheld cameras are ubiquitous. A large fraction of the world's population carries smartphones and most smartphones have one or more cameras. This allows people to document their lives and experiences. Pictures and videos of epic events, spectacular vacations and lifetime milestones are routinely captured by handheld cameras. At the other end of the spectrum, the number of selfies, cat videos and pictures of mediocre meals has also exploded in recent years.

Body-mounted cameras or body-cams go one step further. They automatically go where the user goes and can automatically record what the user is experiencing. Head-mounted or helmet-mounted cameras go even one step further. They automatically view what the user is viewing or, at least where he turns his head. They can record events from this point of view.

However, all of these cameras are separate pieces of equipment that are visible to others. They are also relatively large and are not carried on the user's eye.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

An eye-mounted device includes a contact lens and an embedded camera, which for convenience is referred to as a femtocamera because it is very small. The front aperture of the femtocamera faces away from the user's eye so that the image sensor in the femtocamera captures imagery of a user's external environment. In various embodiments, the femtocamera operates in a visible wavelength band, a non-visible wavelength band, or a combination of both.

The femtocamera optics has a folded optical path, which is advantageous for fitting the femtocamera into the limited space within the contact lens. In one design, the optics for the femtocamera is a two mirror design, with a concave primary mirror followed by a convex secondary mirror in the optical path from the front aperture to the image sensor. In some embodiments, the optical system includes a solid transparent substrate with the primary mirror formed on one face of the substrate and the secondary mirror formed on an opposing face of the substrate. The front aperture is annular and axially positioned between the two mirrors. It may include a lens. Light blocking structures, light-redirecting structures, absorbing coatings and other types of baffle structures are used to reduce or eliminate extraneous light from reaching the image sensor.

The eye-mounted device may include other components in the contact lens: a projector that projects images onto the retina, other types of sensors, electronics, a coil to wirelessly receive power, or an antenna to transmit/receive data, for example. These components, including the femtocamera, may be positioned in front of the pupil in the optical path of the eye. Some components must be positioned within this optical zone, for example in order to project images onto the retina. Other components may be positioned outside the optical zone. The femtocamera may be either within or outside the optical zone.

Figure 1A:
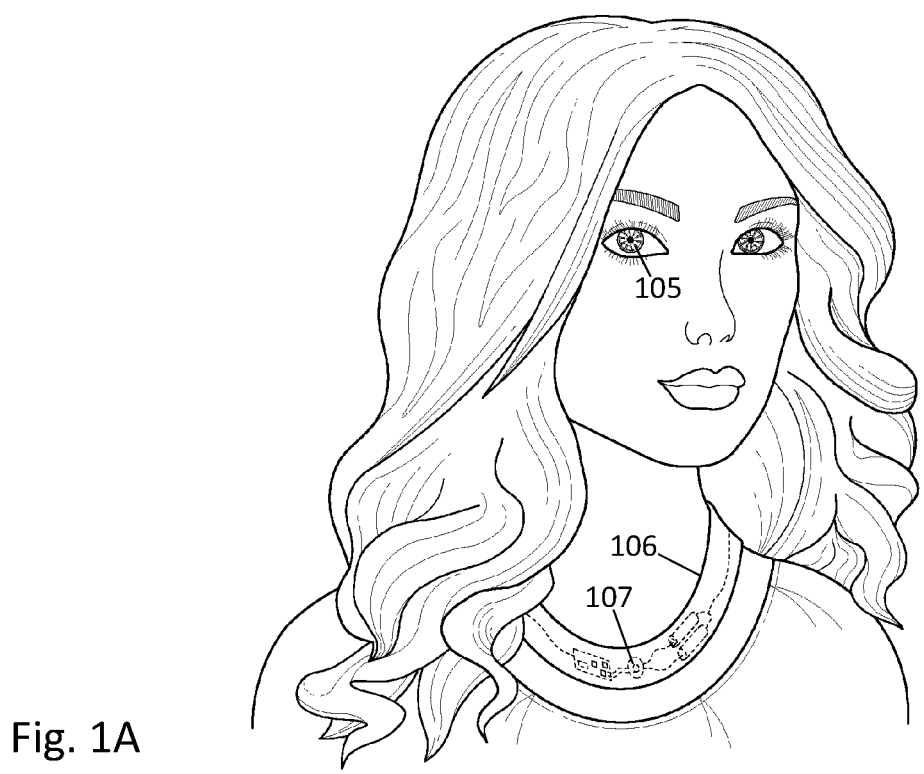
FIG. 1A shows a user wearing an eye-mounted device in communication with an auxiliary necklace.
Figure 1B:
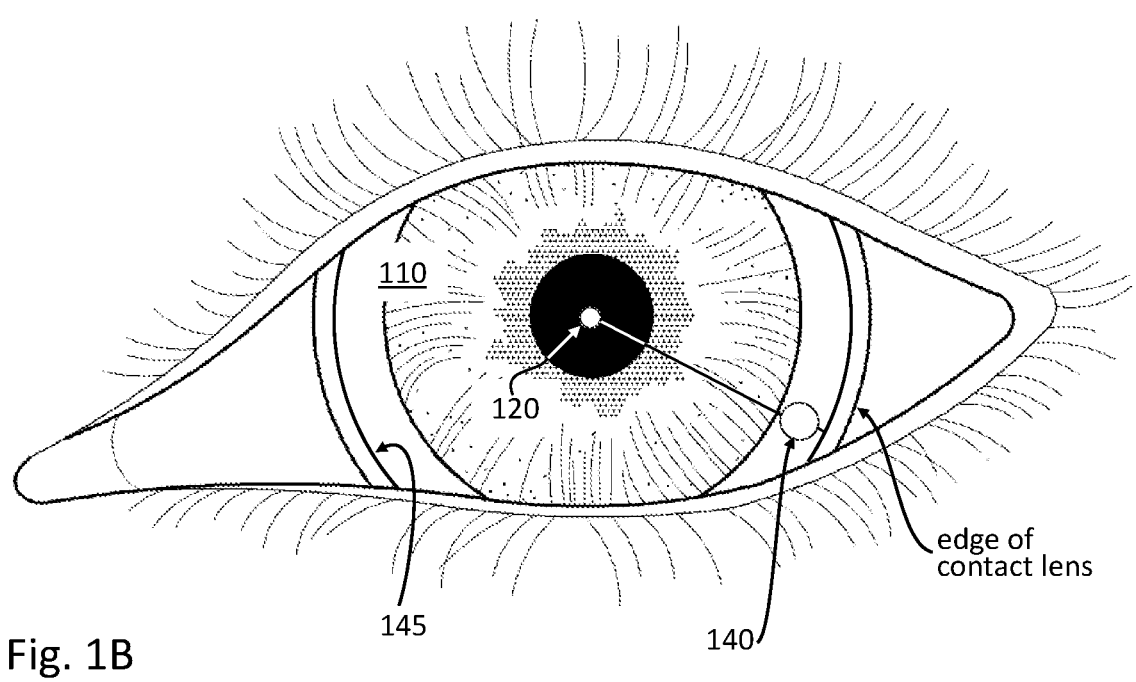
FIG. 1B shows a magnified view of the contact lens device mounted on the user's eye.

In more detail, FIG. 1A shows a user wearing an eye-mounted device 105 in communication with a necklace 106. FIG. 1B shows a magnified view of the user's eye and eye-mounted device. The eye-mounted device 105 includes a contact lens 110 that is worn on the surface of the eye. The following examples use a scleral contact lens but the contact lens does not have to be scleral. The contact lens 110 contains a femtocamera 120. The femtocamera 120 captures images of the external environment.

FIG. 1B shows a front view of the contact lens 110 mounted on a user's eye. The contact lens 110 is placed on the surface of the eye. The contact lens 110 moves with the user's eye as the user's eye rotates in its socket. Because the femtocamera 120 is mounted in the contact lens 110, it also moves with the user's eye. The ratio of the contact lens diameter to femtocamera lateral size is preferably roughly 15:1. This ratio is normally between about 15:1 and 30:1, but may be as small as 5:1 or smaller or as large as 50:1 or larger.

In this example, the contact lens 110 also contains electronics 140 and a coil (or antenna) 145. In some embodiments, the coil 145 is a power coil that receives power wirelessly, for example via magnetic induction. In other embodiments, the contact lens 110 includes a battery that supplies power to the femtocamera 120. The electronics 140 may be used to control the femtocamera, receive or process images from the femtocamera, provide power to the femtocamera, and/or transmit data to/from the femtocamera. The contact lens 110 may also include other components, such as a projector that projects images onto the user's retina (referred to as a femtoprojector).

FIG. 1A shows an implementation where, in addition to the eye-mounted device 105, the user is also wearing a necklace 106 that contains components of the eye-mounted system. In this example, the necklace 106 includes a wireless transceiver 107 that transmits/receives image data and/or transmits power to the eye-mounted device 105. Image transmission to/from an eye-mounted device is subject to data rate constraints due to size and power consumption limitations of electronics in a contact lens.

Figure 2:
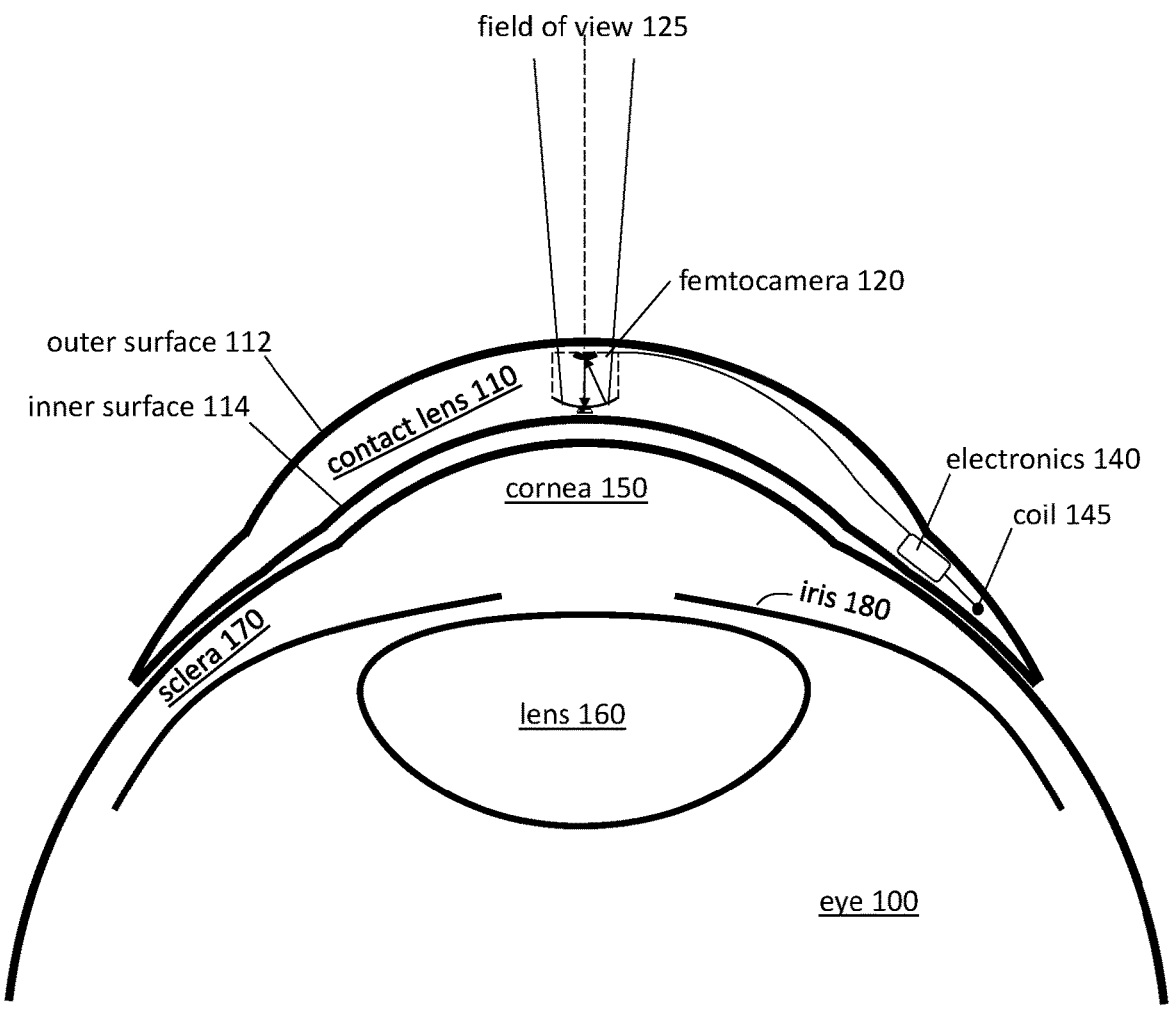
FIG. 2 shows a cross sectional view of a contact lens device with an embedded camera.

FIG. 2 shows a cross sectional view of the contact lens 110 with embedded femtocamera 120. FIG. 2 shows an embodiment using a scleral contact lens but the contact lens 110 does not have to be scleral. The contact lens 110 preferably has a thickness that is less than two mm. The femtocamera 120 preferably fits in a 1 mm×1 mm×1 mm volume, or at least within a 2 mm×2 mm×2 mm volume. The contact lens 110 is comfortable to wear and maintains eye health by permitting oxygen to reach the cornea 150.

For completeness, FIG. 2 shows some of the structure of the eye 100. The contact lens 110 is separated from the cornea 150 of the user's eye 100 by a tear layer. Over the cornea 150, the tear layer may be as thick as a hundred microns or more while it may be only a few microns thick over the sclera 170. The aqueous of the eyeball is located between the cornea and the crystalline lens 160 of the eye 100. The vitreous fills most of the eyeball. The iris 180 limits the aperture of the eye.

The femtocamera 120 is an outward-facing camera, meaning the femtocamera 120 "looks" away from the eye 100 and captures imagery of the surrounding environment. The field of view 125 of the femtocamera 110 may be the same, smaller or larger than a field of view of the user's eye. As shown in more detail below, the femtocamera 110 includes imaging optics, a sensor array and sensor circuitry. The sensor array may be an array of photodiodes. In some embodiments, the sensor array operates in a visible wavelength band (i.e., ~390 nm to 770 nm). Alternatively or additionally, the sensor array operates in a non-visible wavelength band, such as an infrared (IR) band (i.e., ~750 nm to 10 μm) or an ultraviolet band (i.e., <390 nm). For example, the sensor array may be a thermal infrared sensor.

The sensor circuitry senses and conditions sensor signals produced by the sensor array. In some instances, the output signals produced by the sensor circuitry are analog signals. Alternatively, the sensor circuitry may include analog-to-digital converters (ADC), so that the output signals are digital rather than analog. The sensor circuitry may also have other functions. For example, the sensor circuitry may amplify the sensor signals, convert them from current to voltage signals or filter noise from the sensor signals to keep a signal-to-noise ratio below a threshold value. The sensor circuitry may be implemented as a separate electronics module 140. Alternatively, it may be implemented as a backplane to the sensor array. Processing of the images captured by the femtocamera may occur outside the contact lens 110.

FIGS. 3-4 show an example femtocamera design. FIGS. 3 and 4 show cross sectional views and perspective views, respectively, of a femtocamera using two mirrors. The femtocamera of FIG. 3 includes a solid, transparent substrate 310. The solid transparent substrate 310 may be made from plastic, glass or other transparent materials. The femtocamera also includes a concave primary mirror 360 and a convex secondary mirror 350. Either or both of these may be aspheric. The concave primary mirror 360 may be formed by coating an end of the substrate 310 with a reflective material such as a metal (e.g. aluminum or silver) or an engineered stack of dielectric layers. The shape of the primary mirror 360 may be made by any of several different techniques. For example, if the substrate is injection-molded plastic, then the shape of the primary mirror 360 follows the shape of the mold used. Alternatively, the shape of the primary mirror 360 may be made by diamond turning the substrate on a lathe. Or, the shape of the primary mirror 360 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed. These techniques may also be used to form the secondary mirror 350.

The primary mirror 360 includes a clear, non-reflective back aperture 365. An image sensor 340, such as an array of photodiodes, is mounted at this location. Other types of image sensors include phototransistors, CCDs, pyrometer-based sensors, micro-bolometers, and sensors based on vanadium oxide, silicon, indium phosphide, gallium antimonide or gallium arsenide, for example.

The secondary mirror 350 faces the primary mirror 360, and the image sensor 340 faces the secondary mirror 350. Light rays enter the femtocamera through the front aperture 370. They are first incident on and reflected by the primary mirror 360. The reflected rays are then incident on and further reflected by the secondary mirror 350 before reaching the image sensor 340. The primary mirror 360 and secondary mirror 350 cooperate to form an image of the external environment, which is captured by the image sensor 340.

The primary mirror 360 and secondary mirror 350 cooperate to image rays entering through the front aperture 370 onto the image sensor 340. However, not all light rays from the external environment are included in image formation. Those light rays that are used to form an image are referred to as image-forming rays. The remaining light rays are referred to as extraneous rays. In FIG. 3, the front aperture 370 is annular in shape (but not required to be planar). It is defined by an inner edge 372 and outer edge 374. The front aperture 370 limits which rays enter the optical system to form the image. In this design, the front aperture 370 is not axially aligned with either of the mirrors 350, 360. That is, the z-coordinate of the front aperture 370 is between that of the primary mirror 360 and the secondary mirror 350. In FIG. 3, the front aperture 370 is located approximately midway between the two mirrors 350, 360.

The system also includes a light baffle system to block or at least reduce extraneous light. In FIG. 3, the baffle system includes an inner baffle 382 which serves as a three-dimensional obscuration, and a side baffle with an external portion 384 and an internal portion 386. The baffles may be either an integral part of the femtocamera optical system or a surrounding structure in which the optical system is mounted. Absorbing or black baffles may also make the femtocamera less visible to others. In one implementation, the obscuration 382 and internal side baffle 386 are made by depositing an absorbing material such as carbon, roughened or etched nickel ("nickel black"), black chrome, or Vantablack (Surrey NanoSystems, Newhaven, UK) on the transparent substrate 310, which serves as the core of the optical system. Black indium-tin oxide may also be used. The external side baffle 384 may be separate from the substrate 310, for example, it may be an absorbing material deposited on the sides of a hole into which the core is inserted during assembly.

In FIG. 3, the baffle system is designed to block all extraneous rays that would have a direct path from the external environment to the image sensor 340. Accordingly, the obscuration 382 extends an entire length between the secondary mirror 350 and the inner edge 372 of the front aperture. The external side baffle 384 extends from the outer edge 374 of the front aperture away from the primary mirror 360 and is sufficiently long to block all extraneous rays that would propagate through the front aperture 370 directly to the image sensor 340. Although not required in FIG. 3, it may be extended to an edge that is axially aligned with the secondary mirror 350 without adding length to the overall system. The internal side baffle 386 extends an entire length from the outer edge 374 of the front aperture to the primary mirror 360. In other embodiments, the baffle system may block less than all of the extraneous rays, so the baffles may be shorter.

Figure 3A:
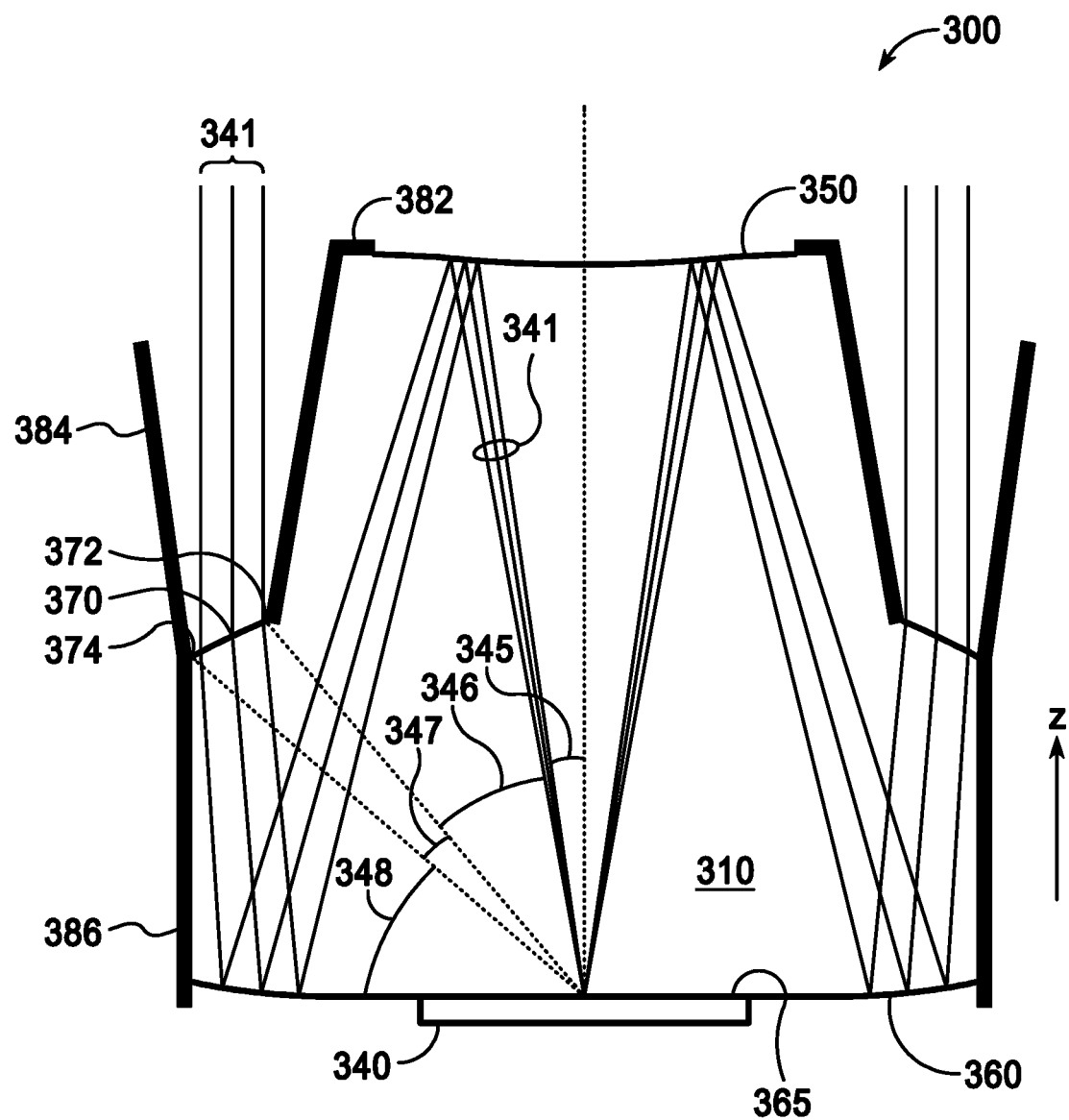
FIGS. 3A-3C show cross sectional views of a femtocamera optical system, with possible ray paths to the center, right edge and left edge of the image sensor, respectively.

FIG. 3A shows possible ray paths to the center point of the image sensor 340. These ray paths may be classified as follows. The bundle of rays 341 are reflected by the primary mirror 360 and the secondary mirror 350 to form the image on the image sensor 340. These are the image-forming rays 341. In FIG. 3A, the image-forming ray bundle 341 is labelled both as it enters through the front aperture 370 and as it propagates from the secondary mirror 350 to the image sensor 340.

The remaining paths are possible paths for extraneous rays, which are managed as follows. Extraneous rays that might have propagated along the ray paths in bundle 345 to the image sensor 340 are blocked by the back side of the secondary mirror 350. Extraneous rays are prevented from reaching the possible ray paths in bundle 346 (between the solid ray and the dashed ray) by the obscuration 382 and secondary mirror 350. Extraneous rays are prevented from reaching the possible ray paths in bundle 347 (between two dashed rays) by the external side baffle 384. The possible ray paths in bundle 348 are blocked by the internal side baffle 386. For clarity, only the lefthand rays are marked in FIG. 3A, but a similar situation exists for the righthand rays. Similar diagrams may also be produced for other points on the image sensor 340.

Figure 3B:
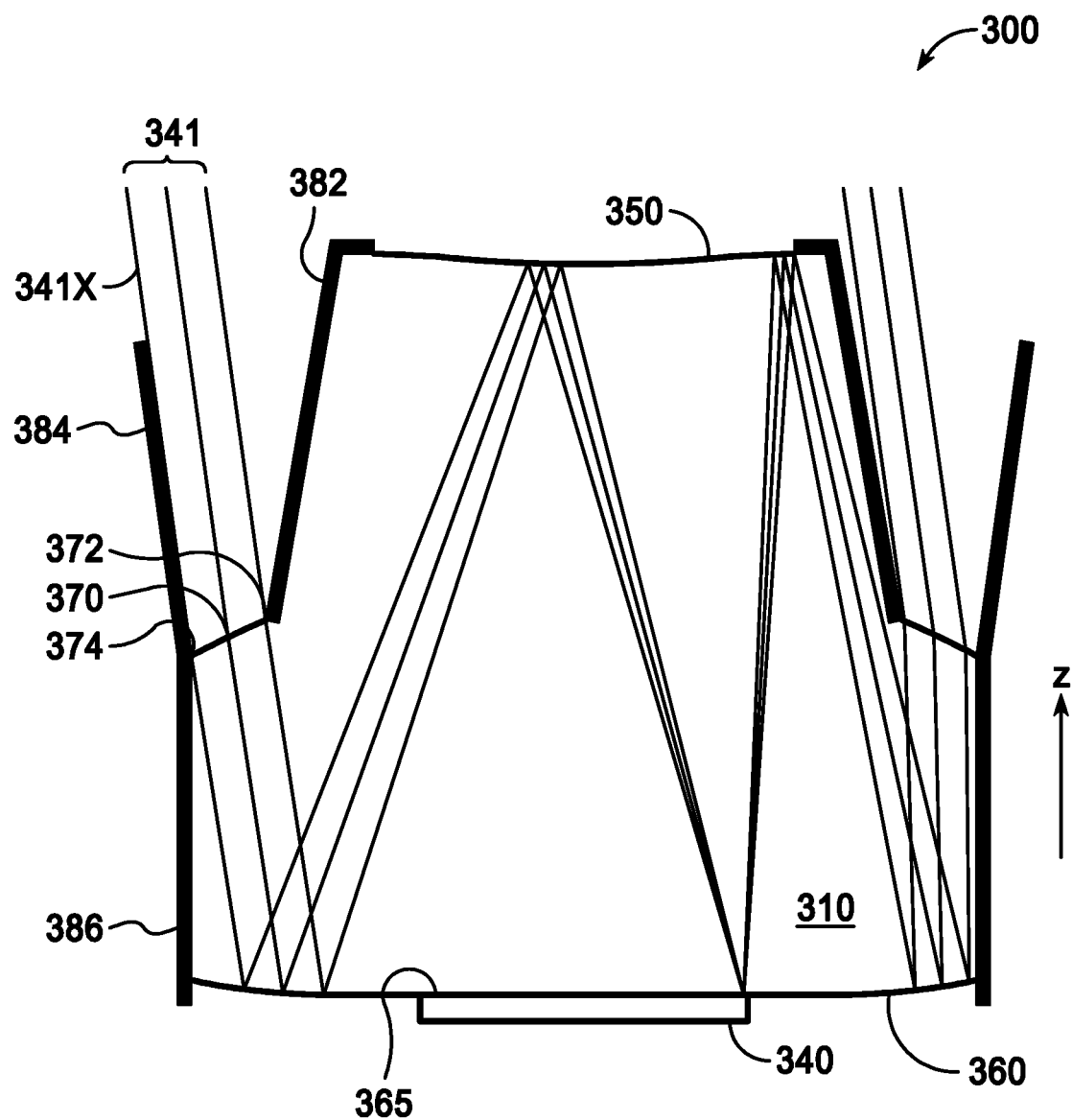
Figure 3C:
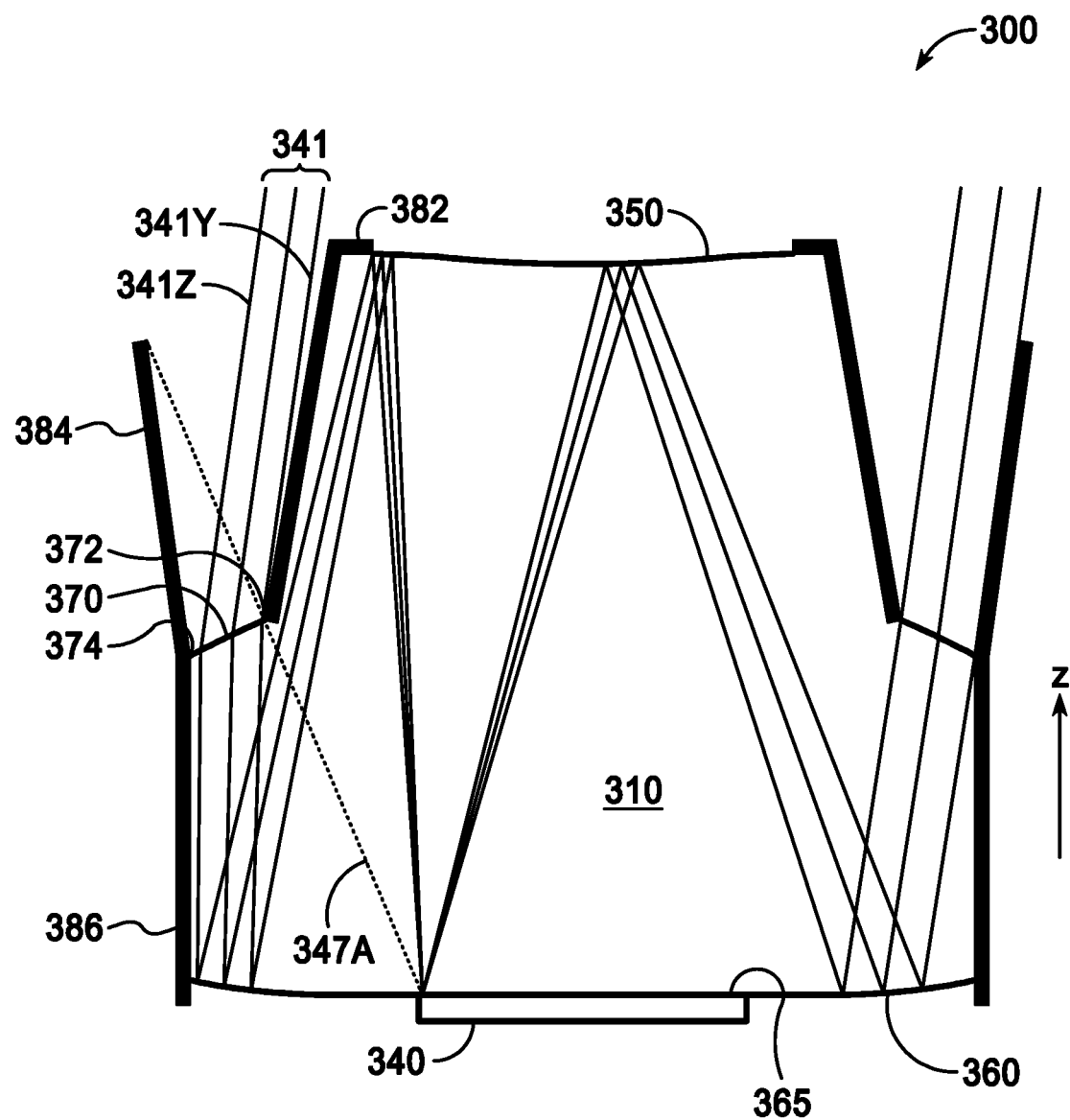

FIGS. 3B and 3C show possible ray paths to the two edge points of the image sensor 340. The extraneous rays are managed in a similar fashion as described in FIG. 3A. The edge points of FIGS. 3B and 3C also lead to the following considerations. Again, consider only the lefthand rays. In FIG. 3B, the external side baffle 384 is tapered outwards (or otherwise shaped) from the outer edge 374 of the front aperture so that it does not block the outermost image-forming ray 341X. Ray 341X passes through the outer edge 374 of the front aperture and is incident on the farthest point of the image sensor 340. As a result, it is propagating at the outermost angle of all image-forming rays. If external side baffle 384 does not block ray 341X, it also will not block any of the other image-forming rays. In addition, as shown in FIG. 3C, the external side baffle 384 is long enough to prevent extraneous rays from reaching ray path 347A. Because ray path 347A passes through the inner edge 372 of the front aperture to the outermost edge of the image sensor 340, it will intersect the side baffle 384 at the farthest possible axial distance from the image sensor 340.

Also in FIG. 3C, the obstruction 382 and internal side baffle 386 are shaped so that they do not block either image-forming ray 341Y or 341Z. Ray 341Y passes through the inner edge 372 of the front aperture and is incident on the nearest point on the image sensor 340. As a result, it is propagating at the innermost angle of all image-forming rays. If obstruction 382 does not block ray 341Y, it also will not block any of the other image-forming rays. In FIG. 3, the three-dimensional obstruction 382 is the combination of an annulus next to the secondary mirror 350 plus a conical frustum that extends the entire length between the annulus and the inner edge 372 of the front aperture.

Figure 4A:
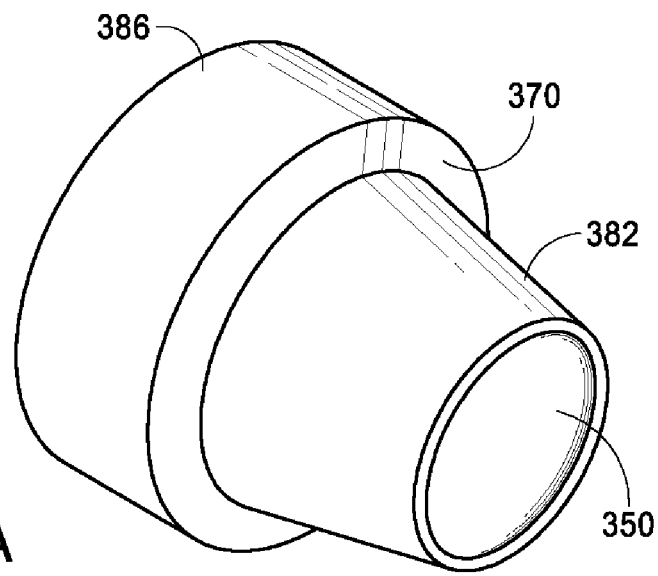
FIGS. 4A and 4B show perspective views of a femtocamera optical system.
Figure 4B:
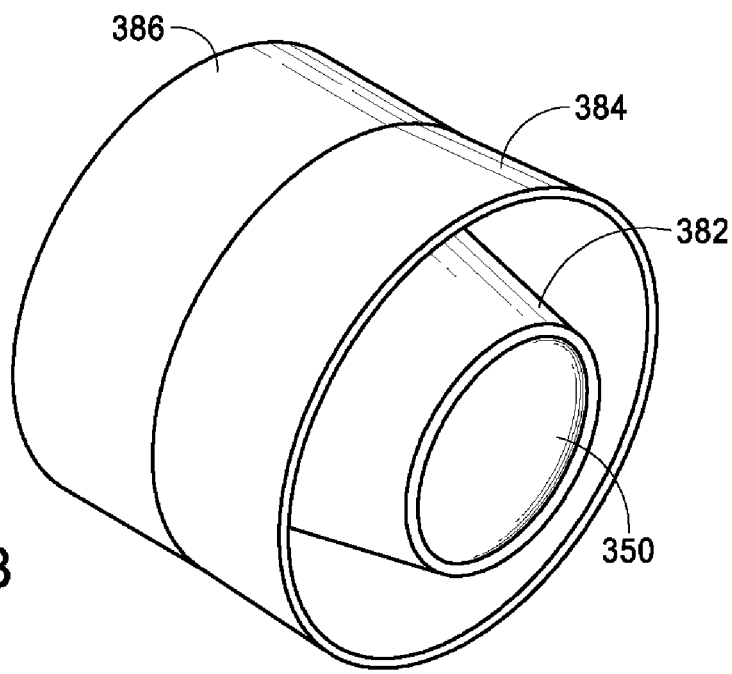

FIGS. 4A-4B show perspective views of the femtocamera optical system from FIG. 3. FIG. 4A shows just the coated substrate 310. The internal side baffle 386 is cylindrical in shape (i.e., the sides are parallel to the optical axis of the system). The obstruction 382 is a frustum plus a narrow annulus, which is adjacent to the secondary mirror 350. The front aperture 370 is the transparent annulus between the internal side baffle 386 and three-dimensional obstruction 382. In some designs, the front aperture 370 has an axial location that is closer to midway between the primary and secondary mirrors, than to either the primary mirror 360 or the secondary mirror 350. For example, if z is the axial dimension and the two mirrors are located at z=0 mm and z=1 mm, then the front aperture is located in the range 0.25 mm<z<0.75 mm. The primary mirror and the back aperture for the image sensor are on the back face of the substrate, which is not visible in FIG. 4A. FIG. 4B also shows the external side baffle 384.

As noted above, the design in FIGS. 3-4 blocks all extraneous rays that would propagate directly to the image sensor 340. However, this is not strictly required. The different baffles 382, 384, 386 do not have to extend the entire lengths shown. They may be shorter in some designs. For example, the obstruction 382 may occupy some of the space between the secondary mirror 350 and the inner edge 372 of the front aperture, but without extending that entire length. It may extend from the secondary mirror 350 towards the primary mirror 360 but without reaching the inner edge 372 of the front aperture. Similarly, the external side baffle 384 may extend from the outer edge 374 of the front aperture, but may not be long enough to block all direct ray paths through the front aperture 370 to the image sensor 340. The same is true for the internal side baffle 386. In some cases, there may not be an internal side baffle 386 if the oblique extraneous rays are weak or managed by another mechanism.

The baffles 382, 384, 386 also do not have to have the shapes shown. For example, any absorbing structure that extends from the edge of the secondary mirror 350 to the inner edge 372 of the front aperture without blocking the image-forming rays 341 shown in FIG. 3C may serve the same purpose as the obstruction 382 with the shape shown in FIG. 3. Different shapes may have advantages in manufacturing or assembly.

As a final set of variations, FIGS. 3B-3C show some situations where certain image-forming rays 341 should not be blocked by the baffles. However, this is not strictly required. Blocking some of the image-forming rays 341 may be acceptable in some designs.

The design of femtocameras is complicated by constraints such as the very small volume in which the system must fit, refractive indices of the substrate and the surrounding contact lens material, and required optical magnification specifications. The size and curvature of the primary and secondary mirrors, the size of the image sensor, and the indices of refraction are all examples of parameters that may be adjusted by an optical designer to optimize different design priorities such as optical throughput, depth of focus, field of view, magnification and resolution.

In some designs, the image sensor 340 is not more than 500 microns wide. For example, the image sensor 340 may be a 500×500 array of sensors, with a sensor-to-sensor pitch of not more than 3 microns and preferably not more than 1 micron. A 500×500 array with 1 micron pitch is approximately 500 microns on a side. An array with 500×500 color pixels using a Bayer pattern is less than 1 mm on a side using 1 micron pitch individual sensors (with three or more individual sensors per color pixel). Image sensors may be other sizes. For example, infrared sensors may be significantly larger. Sensor-to-sensor pitches of 10, 20 or even 40 microns are possible.

Some designs may have a narrow field of view, such as 2 degrees or less. The two-mirror design shown in FIGS. 3-4 is suited for narrower fields of view (for example, in the range of 5 to 15 degrees) and correspondingly higher resolutions. Larger and smaller fields of view are also possible with the two-mirror design.

The specific design of the femtocamera depends on the application. For non-imaging applications, the actual resolution may be lower than used for imaging applications. For example, a femtocamera with a small number (e.g., 10×10 array) of relatively large pixels may be used as a sensor for eye tracking applications. The femtocamera may view a far-away object, or a closer reference object such as the user's nose.

The design shown in FIGS. 3-4 utilizes a folded optical path. As a result, the optics have an optical path that is longer than the thickness of the contact lens. This may result in lower aberrations and higher angular resolutions. The optical path allows the image sensor to be oriented approximately parallel to, rather than perpendicular to, the contact lens surfaces. The femtocamera may occupy not more than 1 to 2 mm of vertical space (i.e., contact lens thickness) and/or the femtocamera may have a lateral footprint of not more than 2 to 4 mm². The front aperture may have a maximum lateral dimension of not more than 1 to 2 mm.

Figure 5:
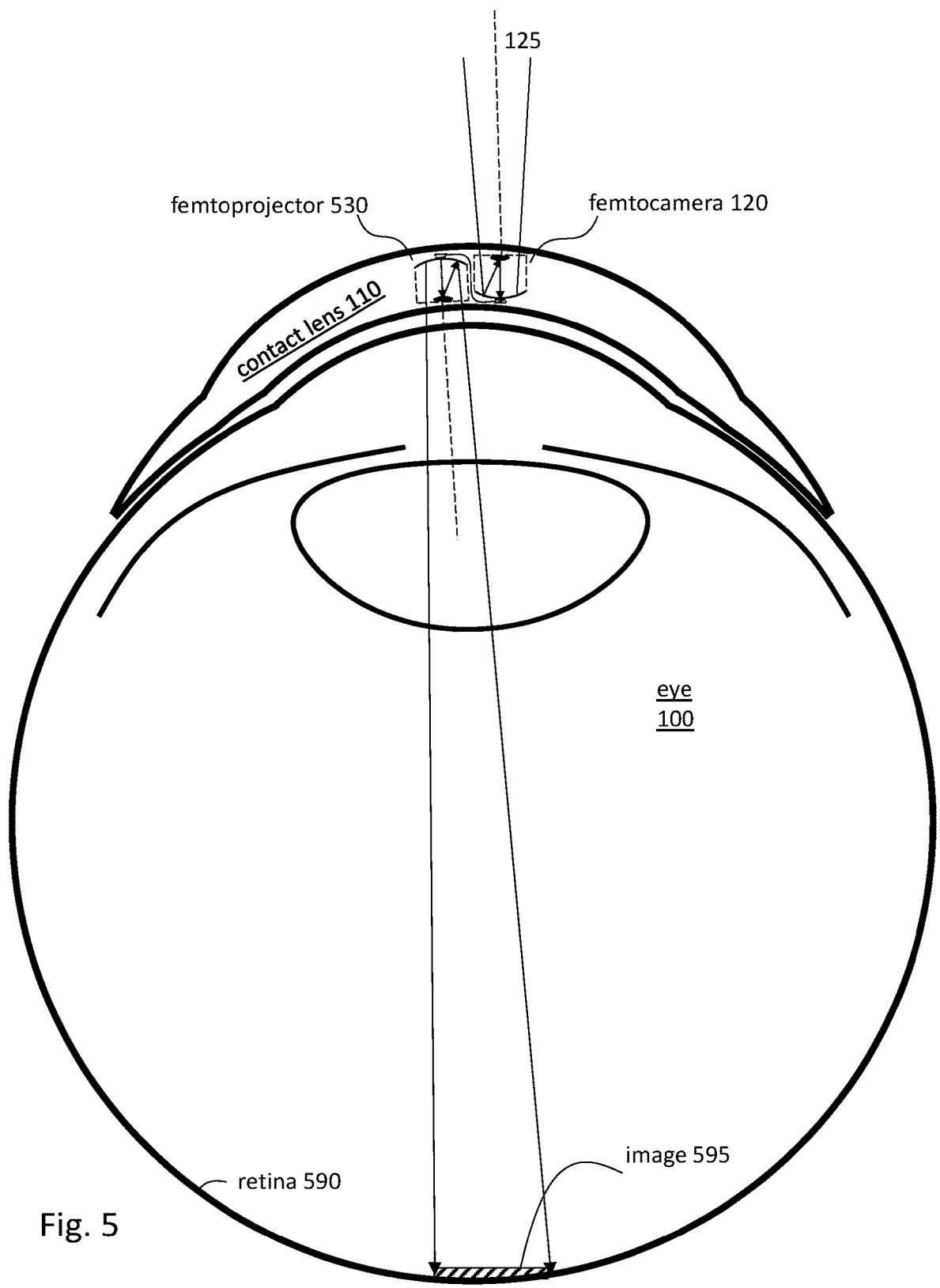
FIG. 5 shows a cross sectional view of an eye-mounted device with a femtocamera and a femtoprojector.

In addition to capturing images of the external environment or providing eye tracking functionality, femtocameras may also be used for other applications in different types of eye-mounted devices. For example, FIG. 5 shows a cross sectional view of an eye-mounted device with a femtocamera 120 and a femtoprojector 530 (i.e., a small projector also contained in the contact lens 110). The femtocamera 120 captures images within its field of view 125. The femtoprojector 530 projects images 595 onto the retina 590 of the user. These two may be coordinated so that the images captured by the femtocamera are used to determine the images 595 projected by the femtoprojector 530.

FIGS. 6-9 show additional variations of the femtocamera optical system of FIG. 3. These variations involve internal refractive interfaces, obscuration position and shape, and other parameters. The design choices are necessarily illustrated in combinations and, to keep the number of figures under control, not every possible combination is shown. For example, the choice of shape of internal refractive interface is largely independent of the choice of obscuration location or obscuration shape. Some combinations of those choices are illustrated. Those skilled in the art will appreciate that other, unillustrated combinations may be desirable in certain situations.

Figure 6:
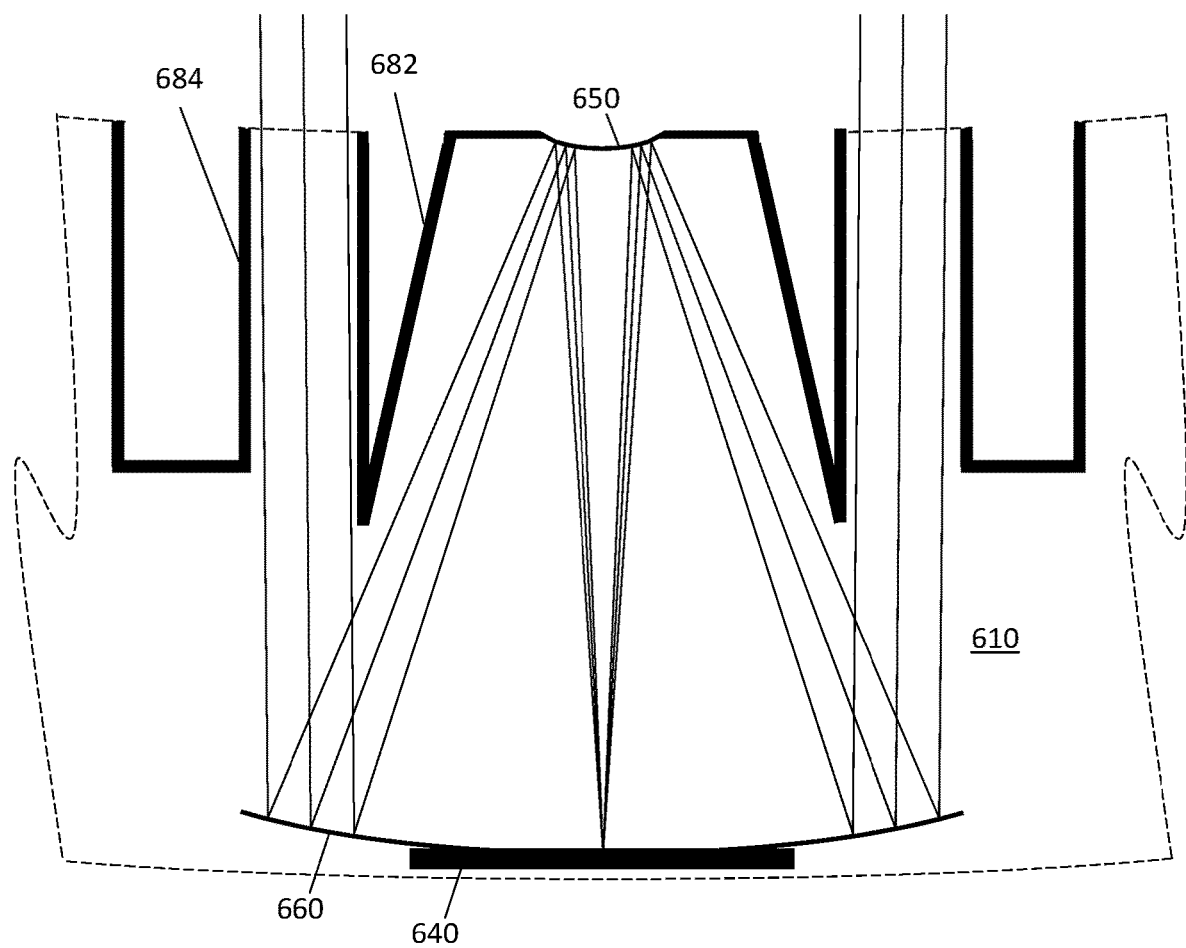
FIG. 6 shows a cross sectional view of another femtocamera optical system.

The design of FIG. 6 is also based on a transparent substrate 610, with the image sensor 640 and primary mirror 660 on one face and the secondary mirror 650 on an opposing face. However, the three-dimensional obscuration 682 is formed by creating a groove in the core material and then coating the interior of the groove with an absorbing material. A partial side baffle 684 is similarly created.

Figure 7:
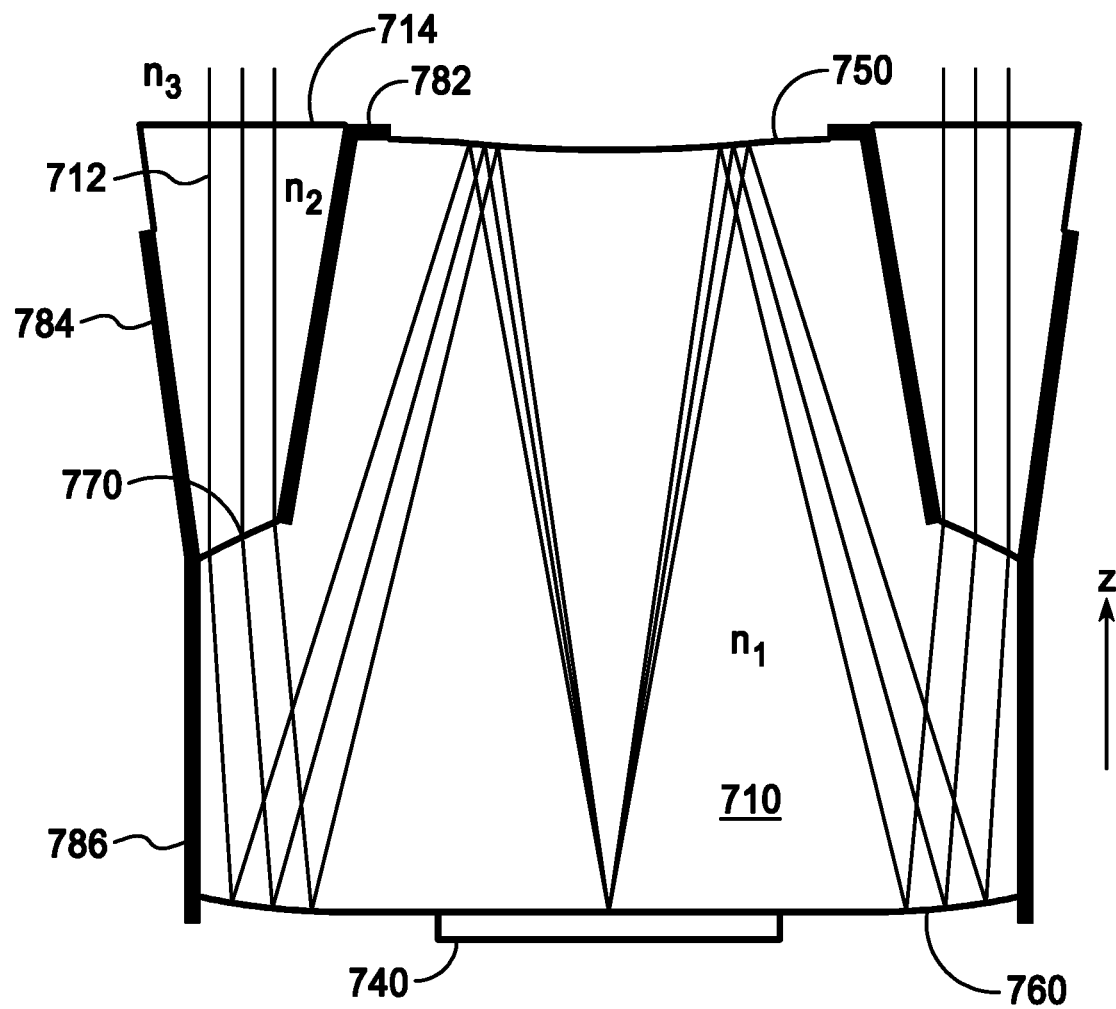
FIG. 7 shows a cross sectional view of yet another femtocamera optical system.

The design of FIG. 7 includes a planarization fill 712. If the core material 710 has refractive index $n_1$, the fill material 712 has a different refractive index $n_2$, and the surrounding material (e.g., the contact lens material) has refractive index $n_3$, then there are two refractive interfaces. The first is at the exit aperture 770. The second refractive interface 714 is between the fill material 712 and the surrounding material. These referactive interfaces may be shaped to achieve various optical functions, for example introducing optical power or correcting optical aberrations.

Figure 8:
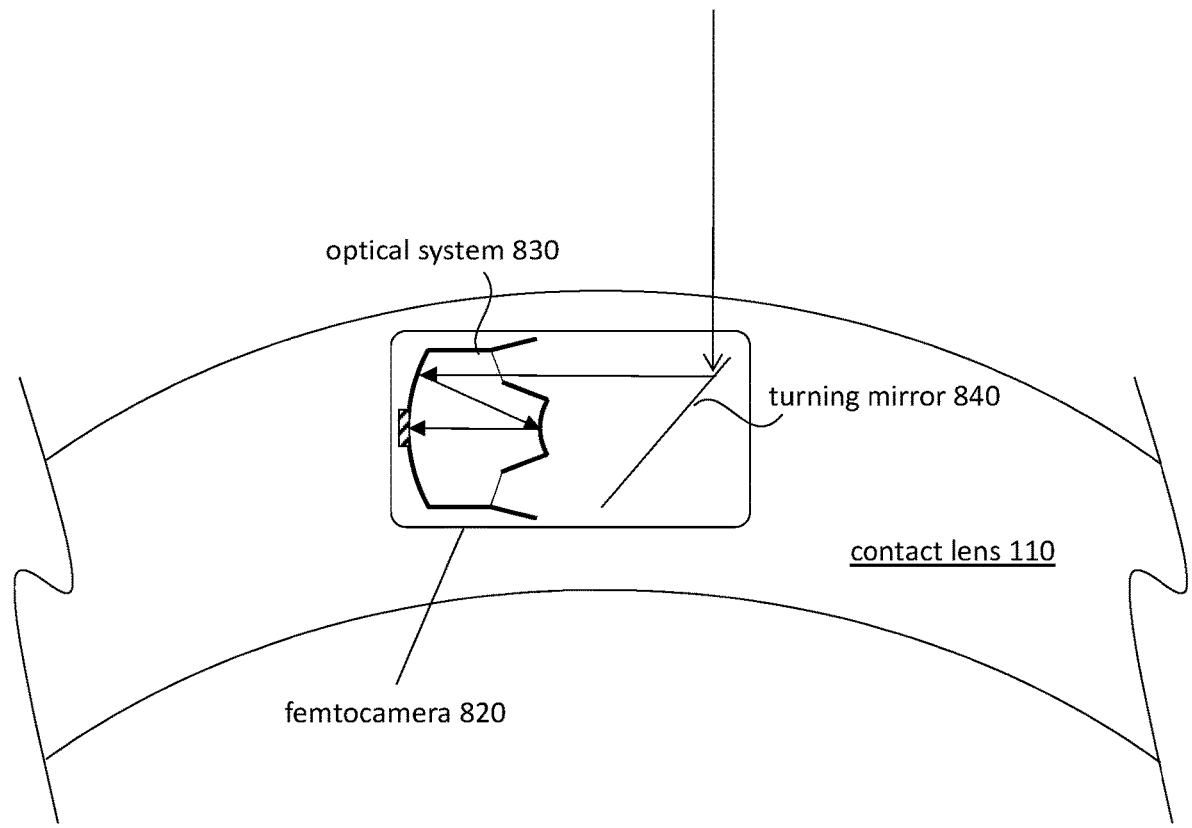
FIG. 8 shows a cross sectional view of a horizontally positioned femtocamera in a contact lens.

In FIG. 2, a femtocamera is shown mounted in a contact lens in a "vertical" configuration. The optical axis and/or axis of symmetry of the femtocamera 120 is approximately perpendicular to the outer surface of the contact lens 110. In FIG. 8, the femtocamera 820 is mounted in a "horizontal" configuration. The optical axis and/or axis of symmetry of the femtocamera optical system 830 is approximately parallel to the outer surface of the contact lens 110. In this configuration, a turning mirror 840 directs image rays from the external environment to the femtocamera optical system 830.

Figure 9:
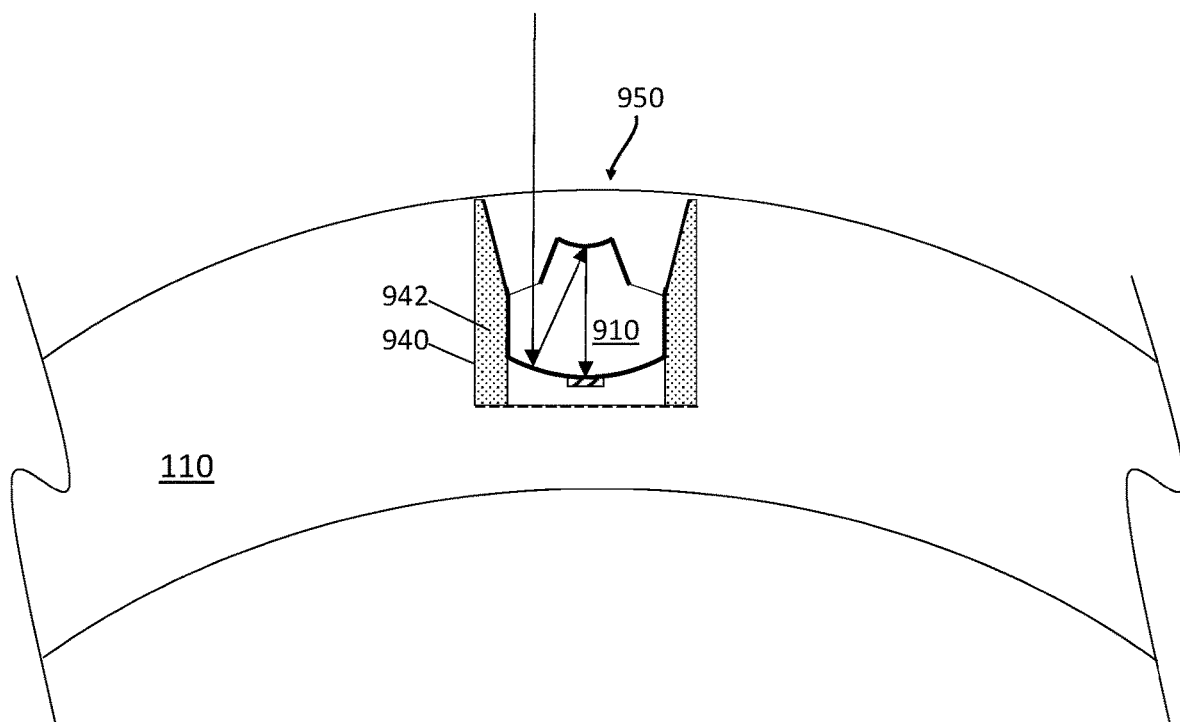
FIG. 9 shows a cross sectional view of yet another femtocamera in a contact lens.

FIG. 9 shows a cross sectional view of yet another femtocamera in a contact lens 110. The assembly of FIG. 9 has the following structure. A cavity 950 is formed in the contact lens 110 and the solid core 910 shown in FIG. 4A is inserted into the cavity 950. In this example, the cavity 950 tapers inwards from the outer surface of the contact lens and then has straight sidewalls where it contacts the core 910. The sidewalls of the cavity 950 are absorbing. This may be achieved by coating the sidewalls of the cavity. Alternatively, a larger hole 940 may first be formed and filled with dark colored epoxy 942 (Master Bond EP42HT-2MED Black, for example). The cavity 950 is then formed in the epoxy. The remaining dark colored epoxy 942 serves as the absorbing side baffle for the femtocamera. Materials other than epoxy may be used. Its sides may be coated instead, for example.

A variety of femtocamera optical systems have been described. Each of them may be made small enough to fit in a contact lens using plastic injection molding, diamond turning, photolithography and etching, or other techniques. Most, but not all, of the systems include a solid cylindrical transparent substrate with a curved primary mirror formed on one end and a secondary mirror formed on the other end. Any of the designs may use light blocking, light-redirecting, absorbing coatings or other types of baffle structures as needed to reduce stray light.

When a femtocamera optical system is described as "cylindrical", its cylindrical shape may include a flat on a sidewall. In other words, the circular cross section of a perfect cylinder is not a requirement, just an overall cylindrical shape. Optical systems may also be made from extrusions of other shapes, such as triangles, squares, pentagons, etc.

Although the detailed description contains many specifics, these should not be construed as limiting the scope of the invention but merely as illustrating different examples. It should be appreciated that the scope of the disclosure includes other embodiments not discussed in detail above. For example, the designs in FIGS. 3-4 all use solid substrates, but an air core may also be used. As another example, although the femtocamera is described as embedded in a contact lens, small cameras may also be used in other applications, such as embedded in an eyeglasses lens, used in endoscopes, or mounted on drones. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An eye-mounted device comprising:
 a contact lens; and
 a femtocamera mounted in the contact lens, where the femtocamera is not larger than 2 mm×2 mm×2 mm, the femtocamera comprising:
  a front aperture facing away from a user's eye and towards an external environment;
  a concave primary mirror facing the front aperture;
  a convex secondary mirror facing the concave primary mirror;
  an image sensor, the primary mirror and secondary mirror cooperating to image the external environment onto the image sensor; and
  a baffle system comprising:
   a three-dimensional obscuration extending from the secondary mirror towards the primary mirror, where the obscuration blocks extraneous rays from the external environment from reaching the image sensor.

2. The eye-mounted device of claim 1, further comprising:
 a femtoprojector mounted in the contact lens, the femtoprojector projecting images detected by the femtocamera to the user's retina.

3. The eye-mounted device of claim 1, where the front aperture includes a refractive interface between two materials of different indices of refraction.

4. The eye-mounted device of claim 1, where the femtocamera further comprises a lens located at the front aperture.

5. The eye-mounted device of claim 1, where the baffle system further comprises:
 an internal side baffle extending from the outer edge of the front aperture toward the primary mirror.

6. The eye-mounted device of claim 1, further comprising:
 a solid transparent substrate with the primary mirror on one face of the solid transparent substrate and with the secondary mirror and the front aperture on opposing faces of the solid transparent substrate.

7. An eye-mounted device comprising:
 a contact lens; and
 a femtocamera mounted in the contact lens, the femtocamera comprising:
  a front aperture facing away from a user's eye and towards an external environment, where the front aperture has a maximum lateral dimension of not more than 1 mm;
  a concave primary mirror facing the front aperture;
  a convex secondary mirror facing the concave primary mirror;
  an image sensor, the primary mirror and secondary mirror cooperating to image the external environment onto the image sensor; and
  a baffle system comprising:
   a three-dimensional obscuration extending from the secondary mirror towards the primary mirror, where the obscuration blocks extraneous rays from the external environment from reaching the image sensor.

8. An eye-mounted device comprising:
 a contact lens; and
 a femtocamera mounted in the contact lens, the femtocamera comprising:
  a front aperture facing away from a user's eye and towards an external environment;
  a concave primary mirror facing the front aperture;
  a convex secondary mirror facing the concave primary mirror;
  an image sensor, the primary mirror and secondary mirror cooperating to image the external environment onto the image sensor; and
  a baffle system comprising:
   a three-dimensional obscuration extending from the secondary mirror towards the primary mirror, where the obscuration blocks extraneous rays from the external environment from reaching the image sensor;
  where:
   the front aperture is positioned at an axial location that is between the concave primary mirror and the convex secondary mirror;
   the front aperture has an inner edge and an outer edge;
   the three-dimensional obscuration is positioned between the secondary mirror and the inner edge of the front aperture; and
   the obscuration blocks extraneous rays from propagating from between the secondary mirror and the inner edge directly to the image sensor.

9. The eye-mounted device of claim 8, where an axial location of the front aperture is closer to midway between the primary and secondary mirrors, than to either the primary mirror or the secondary mirror.

10. The eye-mounted device of claim 8, where the obscuration extends an entire length between the secondary mirror and the inner edge of the front aperture.

11. The eye-mounted device of claim 8, where the obscuration comprises:
 an annular portion adjacent to the secondary mirror; and
 a frustum-shaped portion extending an entire length between the annular portion and the inner edge of the front aperture.

12. The eye-mounted device of claim 8, where the baffle system further comprises:
 an external side baffle extending from the outer edge of the front aperture away from the primary mirror, where the external side baffle blocks extraneous rays from propagating through the front aperture directly to the image sensor.

13. The eye-mounted device of claim 12, where the external side baffle blocks all extraneous rays from propagating through the front aperture directly to the image sensor, and the external side baffle does not extend beyond the secondary mirror.

14. The eye-mounted device of claim 12, where the external side baffle does not extend beyond the secondary mirror.

15. The eye-mounted device of claim 12, where the external side baffle is tapered outwards from the outer edge of the front aperture.

16. The eye-mounted device of claim 15, where the external side baffle is tapered at an angle in a range of 2.5 to 10 degrees.

17. The eye-mounted device of claim 8, where the baffle system further comprises:

an internal side baffle extending from the outer edge of the front aperture toward the primary mirror.

18. The eye-mounted device of claim 8, further comprising:
a solid transparent substrate with the primary mirror on one face of the solid transparent substrate and with the secondary mirror and the front aperture on opposing faces of the solid transparent substrate.

19. The eye-mounted device of claim 18, where the primary mirror and secondary mirror are implemented as reflective coatings on the substrate, and the obscuration is implemented as an absorptive coating on the substrate.

20. The eye-mounted device of claim 8,
where the baffle system further comprises:
an external side baffle extending and tapering outwards from the outer edge of the front aperture away from the primary mirror, where the external side baffle blocks extraneous rays from propagating through the front aperture directly to the image source; and
an internal side baffle extending from the outer edge of the front aperture toward the primary mirror; and
the femtocamera further comprises:
a solid transparent substrate, with the primary mirror implemented as a reflective coating on one face of the solid transparent substrate, with the secondary mirror implemented as a reflective coating on an opposing face of the solid transparent substrate, with the front aperture implemented as a refractive interface on another opposing face of the solid transparent substrate, and with the obscuration and the internal side baffle implemented as absorptive coatings on the solid transparent substrate.

* * * * *